United States Patent Office 3,720,831
Patented Mar. 13, 1973

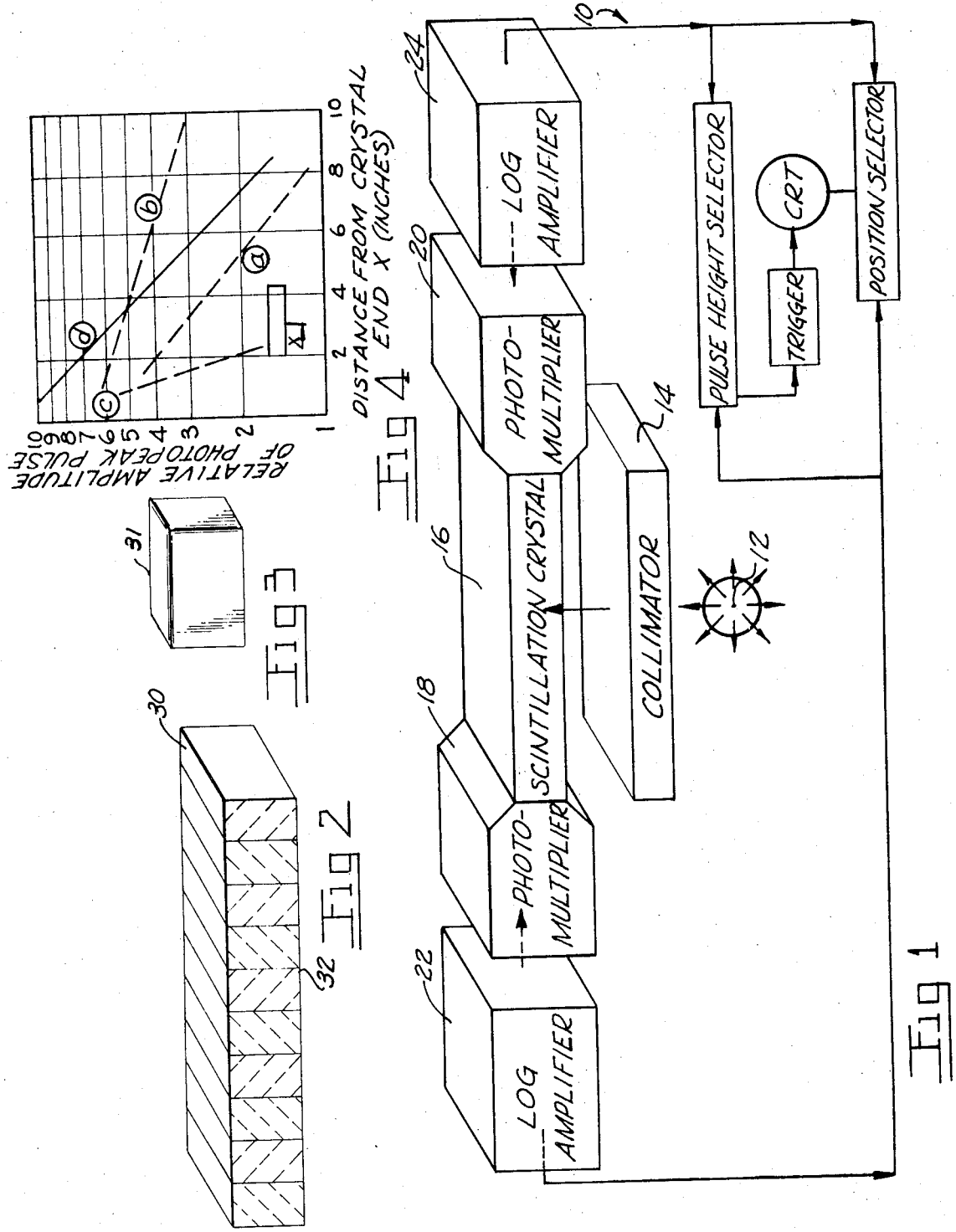

3,720,831
SCINTILLATION CRYSTAL STRUCTURE COMPRISING A SERIES OF RECTANGULAR WAFERS FORMING A BAR
Floro D. Miraldi, 2660 Edgehill Road,
Cleveland Heights, Ohio 44106
Filed Mar. 9, 1971, Ser. No. 122,440
Int. Cl. G01t 1/20
U.S. Cl. 250—71.5 R 9 Claims

ABSTRACT OF THE DISCLOSURE

A scintillation crystal including a series of rectangular wafers having their adjacent faces adhered to one another with optical adhesive to form a bar. Radiation is received through a side of the crystal bar. Scintillations in the crystal are detected at the ends of the bar by means of photosensitive devices.

BACKGROUND OF THE INVENTION

This invention is designed to be used in the type of device described in application Ser. No. 48,166, filed June 22, 1970, now U.S. Pat. No. 3,688,113. The general concept of the use of a moving bar of scintillation crystals for a fast scanning system was proposed by David and Martone, J. Nuclear Med. 7:114–127, February, 1966. In their system, a rod of phosphor was moved linearly in one direction across the region to be scanned. A two dimensional map of the radioactive distribution of the scanned body was obtained by noting the bar position and simultaneously determining the position of a scintillation along the bar. Although the bar position could be accurately ascertained, the scintillation position along the bar was very uncertain. The system, therefore, yielded poor resolution.

The poor resolution along the bar was due to two main factors: (1) the crystal design used did not yield good resolution, and (2) the electronics did not adequately discriminate between the electrical impulses in the desired range. The above-noted application considers the latter point and deals with it at some length. This invention pertains to the crystal design.

In the past it has always been difficult to determine with great accuracy the position of a scintillation in a scintillation crystal in the form of a bar. This invention generally relates to the determination of the position of a scintillation in a bar scintillation crystal by observing the amplitude of the light pulses exiting from the ends of the bar. If $A(x)$ represents the spectral distribution from a scintillation occurring at position $x$ measured from one end of the bar, the functional dependence has been empirically shown to be $A(x) = A(0)e^{-\alpha x}$ where $\alpha$ is a function of several crystal parameters and $A(0)$ is a constant when $x=0$. In order to discriminate between two scintillations a distance $\Delta x$ apart, the change in $[A(x+\Delta x) - A(x)]$ must be significant with regard to the electronic capability. This can be shown mathematically as follows:

$$A(x) = A(0)e^{-\alpha x}$$

$$A(x+\Delta x) = A(0)e^{-\alpha(x+\Delta x)}$$
$$= A(0)e^{-\alpha x - \alpha \Delta x}$$
$$= [A(0)e^{-\alpha x}]e^{-\alpha \Delta x}$$

Then
$$A(x+\Delta x) - A(x) = (A(0)e^{-\alpha x})e^{-\alpha \Delta x} - A(0)e^{-\alpha x}$$
$$= A(0)e^{-\alpha x}[e^{-\alpha \Delta x} - 1]$$

Therefore a change of $[A(x+\Delta x) - A(x)]$ is proportional to $$[e^{-\alpha \Delta x} - 1]$$

For a fixed capability of electronics, the value $\Delta x$ becomes smaller the larger the $\alpha$. The value of $\alpha$ can be varied by adjusting the reflectivity of the crystal at its surface. Theoretically, $\alpha$ could vary from zero (perfect reflector) to some maximum value corresponding to a perfect absorber at which time the attenuation would have an inverse square dependence. David and Martone chose to adjust $\alpha$ by manipulation of the surface reflectivity and thereby encountered problems.

The problems included a failure to realize that increasing the constant by altering the reflectivity causes the entire spectrum to become depressed. That is, they failed to realize that the constant $A(0)$ is depressed as reflectivity decreased. Therefore, all values of $A(x)$ are reduced and as $A(x)$ decreases, the uncertainty of the spectrum increases. If one considers only the photopeak, for example, this says that the spread in the photopeak increases and the amplitude decreases as the reflectivity decreases. Thus, the factor tending to improve spatial resolution is counteracted by another tending to destroy it.

The solution to the dilemma is to prepare the surface in a manner to yield the highest reflectivity possible. This then provides the highest $A(0)$ and, in general, the smallest uncertainty. With high reflectivity, a large value must be obtained by taking advantage of other parameters. The easiest to apply is geometry, but another is optical transmission of the crystal. All crystal designs which are described are therefore made with high surface reflectivity, but with drastic geometry alterations to yield large $\alpha$'s. In addition to the designs described below, a large number of other systems and/or variations could be suggested but success will only be obtained if high reflectivity is coupled with large $\alpha$ from geometry or transmission changes.

SUMMARY OF THE INVENTION

A scintillation crystal formed of wafers having their faces joined together with optical adhesive and having a generally uniform cross-section to form a bar.

FIG. 1 is a schematic representation of the type of system in which the scintillation crystal of this invention is used.

FIG. 2 is a perspective view of the scintillation crystal of this invention.

FIG. 3 is an alternate embodiment of the scintillation crystal.

FIG. 4 sets forth a group of curves with respect to light attenuation within the scintillation crystal.

PREFERRED EMBODIMENT

The system 10 includes a source of gamma or other radiation 12, transmitting radiation through a collimator 14 to scintillation crystal 16. In the scintillation crystal the radiation is converted to light radiation which is detected by photomultiplier tubes 18 and 20. Electrical outputs proportional to the light radiation is transmitted from the photomultiplier tubes 18 and 20 to electronics.

The electronics include log amplifiers 22 and 24 respectively which receive the electrical impulses from the photomultiplier tubes and transmit them to a pulse height selector. The selector is used to discriminate between different pulses which then triggers a cathode ray tube to give signals. A position selector is also electronically connected with the log amplifiers to aid in determining the location of the scintillation within the crystal. The details of the actual system in which this scintillation crystal is used is disclosed in an earlier application, Ser. No. 48,166, the disclosure of which is hereby incorporated by reference.

FIGS. 2 and 3 illustrate alternate embodiments of the scintillation crystal of this invention. FIG. 2 shows a rectangular cross-section of a bar while FIG. 3 illustrates a square cross-section. In both of these embodiments, the scintillation crystal comprises wafers 30 and 31 having their faces held in contact with one another. The actual surface contact may be done by means of an optical adhesive such as Epon epoxy which is commercially available. The individual wafers particularly those noted in FIG. 3, have a dimension of 1" by 1" by ¼" thick. In FIG. 2 an embodiment with which success has been realized has a measurement of 1" by 1½" by ¼" thick.

In both of these embodiments radiation is received somewhere along the length of the crystal through the sides 32. When the scintillation occurs the radiation is converted to light radiation which passes through the wafers and their adjacent faces. It has been found that the use of the adjoining faces acts as an attenuation factor which brings about an extraordinary accuracy in locating the actual location of the scintillation along the length of the crystal.

A highly significant and unexpected result was found by using the crystal design described in this application. Some background is needed, however, to fully understand the significance of this improvement. As noted in FIG. 1, the signals from the photomultiplier tubes are changed to logarithms before acted upon by a pulse height selector. Previously, pulse photopeak height selection was made before conversion to logarithms. However, because the variation of the signal at the end of the scintillation crystal with distance along the crystal was exponential and not linear it was difficult if not impossible to make an accurate pulse height selection. Converting the amplitudes to logarithms of the amplitudes and thereby obtaining a linear distribution, it became possible to sum the logarithms, obtain a constant and make an accurate pulse height selection. This relationship can be shown mathematically as:

$$lnA_1 = lnA_0 - \alpha x$$
$$lnA_2 = lnA_0 - \alpha(L-x)$$

where $A_1$ is the amplitude of a pulse received by the first photomultiplier tube, $A_2$ is the amplitude of the pulse received by the second photomultiplier tube for a given distance $x$ for a scintillation along the scintillation crystal having a length equal to L. $A_0$ is a constant equal to the response of the photomultiplier tube when $x$ is equal to 0. Alpha ($\alpha$) is a constant and determined by the attenuation of the crystal. Adding logarithms $A_1$ plus logarithm $A_2$ results in $$2lnA_0 - \alpha L$$

Since $A_0$ is a constant, alpha is a constant and L is a constant the sum of the logarithms is therefore equal to a constant. The attenuation constant is also significant in determining the position of the scintillation within the crystal. Using the same illustration above, if the logarithm $A_1$ is subtracted from logarithm $A_2$, the result is equal to $\alpha L - 2\alpha x$. That is, the difference of the logarithms is directly proportional to a constant times the length of the crystal minus a term proportional to the location ($x$) of any scintillation along the length of the crystal.

The important part of this relationship has a very practical significance and is illustrated in FIG. 4. The attenuation factor $\alpha$ represents the slope of the curve. In the selection of a scintillation crystal, the attenuation factor must be adjusted to give it a slope which provides finite and easily detectible differences for different scintillation locations. Specifically, if the slope in FIG. 4 were very small, such as the dotted curve $b$, it would be nearly horizontal. Differences in length along the crystal therefore would make no significant difference in the logarithms of the amplitudes and therefore the positions of scintillation would be nearly impossible to determine. On the other hand, if the slope governed by the attenuation constant were very large and the curves were steep, the uncertainty in the amplitude of the photopeaks at lower relative amplitudes becomes so great that position is again difficult to determine. This type of curve is illustrated as a dotted curve $c$.

Previously, the shape of the scintillation crystal was chosen to give a curve such as illustrated as curve $a$. It has an acceptable slope to give realistic differences of logarithms of the amplitudes so they could be protected within an acceptable uncertainty. The problem with the type of curve $a$ is that it functions very well for the scintillations near the end of the scintillation crystal where the photomultiplier is located. However, as the distance from the ends increase, the relative amplitude of the photopeak pulse becomes so small that it was difficult to detect.

With this invention, that is the use of wafers having their adjacent faces abutting each other, it was found that the acceptable slope of the curve could be maintained while raising the entire curve within the bounds of the graph. That is, greater signals could be obtained from the relatively distant location of scintillations by the photomultiplier tubes without destroying the slope or shape of the curve.

I claim:

1. A scintillation crystal for use in a radiation sensitive device comprising:

a series of generally uniformly shaped wafers having their adjacent faces aligned and in contact with one another to form a bar having ends whereby radiation may be received by the rod causing scintillations which result in light radiation, the adjacent faces of the wafers being transverse to the path of the light radiation and acting as attenuators for the light radiation, the positions of the scintillations occurring within the rod thereby being detectable by measurement taken at the ends of the bar.

2. The scintillation crystal of claim 1 wherein the wafers have substantially uniform dimensions.

3. The scintillation crystal device of claim 2 wherein the wafers are sealed to each other with an optical epoxy which transmits light radiation.

4. The scintillation crystal of claim 3 wherein the wafers are square.

5. The scintillation crystal of claim 4 wherein the wafers are comprised of sodium iodide and have a generally uniform shape of about 1" by 1" by ¼".

6. The scintillation crystal of claim 3 wherein the wafers are rectangularly shaped.

7. A scintillation crystal comprising:

a series of square wafers with substantially uniform dimensions having their adjacent faces adhered to one another, the wafers having a generally uniform shape and aligned so their sides form a substantially uniform plane to receive radiation, the radiation being converted to light radiation during scintillations in the crystal, the adjacent faces of the wafers being transverse to the path of the light radiation and acting as attenuators of the light radiation.

8. The process of detecting radiation comprising:
receiving invisible radiation in a scintillation crystal comprised of wafers having their adjacent faces in contact with one another to form a bar having ends;
converting the radiation to light radiation as the radiation strikes the crystal causing scintillations;
attenuating the light radiation by having it pass through the adjacent faces of the wafer, the adjacent faces being transverse to the path of the light radiation;
detecting the light radiation at the ends of the crystal.

9. The process of claim 8 which further includes attenuating the light radiation by having it pass through adjacent faces of generally uniform shaped rectangular wafers of a substantially equal thickness.

References Cited

UNITED STATES PATENTS

| | | | |
|---|---|---|---|
| 3,169,187 | 2/1965 | Stone et al. | 250—71.5 R |
| 3,005,100 | 10/1961 | Thompson | 250—71.5 R |
| 3,149,230 | 9/1964 | Hall, Jr. | 250—71.5 R |
| 3,247,377 | 4/1966 | Hall, Jr. | 250—71.5 R |
| 3,101,407 | 8/1963 | Shipman, Jr. | 250—71.5 R |
| 3,102,955 | 9/1963 | Carlson | 250—71.5 R |

ARCHIE R. BORCHELT, Primary Examiner

U.S. Cl. X.R.

250—71 R